(12) United States Patent
Hurley

(10) Patent No.: US 6,185,352 B1
(45) Date of Patent: Feb. 6, 2001

(54) OPTICAL FIBER RIBBON FAN-OUT CABLES

(75) Inventor: William C. Hurley, Hickory, NC (US)

(73) Assignee: Siecor Operations, LLC, Hickory, NC (US)

( * ) Notice: Under 35 U.S.C. 154(b), the term of this patent shall be extended for 0 days.

(21) Appl. No.: 09/511,922

(22) Filed: Feb. 24, 2000

(51) Int. Cl.⁷ .................................................. G02B 6/44
(52) U.S. Cl. ............................................................ 385/114
(58) Field of Search ................................................ 385/114

(56) References Cited

U.S. PATENT DOCUMENTS

| | | | |
|---|---|---|---|
| 4,272,155 | 6/1981 | Slaughter | 350/96.23 |
| 4,895,427 | 1/1990 | Kraft | 350/96.23 |
| 4,913,517 | * 4/1990 | Hopper et al. | 385/107 |
| 4,960,318 | * 10/1990 | Nave et al. | 385/103 |
| 5,229,851 | 7/1993 | Rahman | 385/114 |
| 5,249,249 | 9/1993 | Eoll et al. | 385/114 |
| 5,271,080 | * 12/1993 | Arroyo et al. | 385/76 |
| 5,343,549 | * 8/1994 | Fan | 385/103 |
| 5,389,442 | * 2/1995 | Grulick | 428/396 |
| 5,469,522 | * 11/1995 | Wagman | 385/98 |
| 5,621,841 | * 4/1997 | Field | 385/113 |
| 5,729,966 | * 3/1998 | Grulick et al. | 57/293 |
| 5,848,212 | * 12/1998 | Wagman | 385/111 |
| 5,904,037 | * 5/1999 | Grulick | 57/264 |
| 5,930,431 | * 7/1999 | Lail et al. | 385/100 |

OTHER PUBLICATIONS

Siecor Products Report, Non–Plenum Ribbon Interconnect Cables, Sep. 1998, pp. 1–2.
Siecor Products Report, Plenum Ribbon Interconnect Cables, Nov. 1998, pp. 1–2.

\* cited by examiner

*Primary Examiner*—Akm E. Ullah
(74) *Attorney, Agent, or Firm*—Timothy J. Aberle

(57) ABSTRACT

A fiber optic fan-out cable having optical sub-units. The optical sub-units are disposed about a central member, at least some of the optical sub-units each respectively comprising a sub-unit jacket, strength fibers, and at least one respective optical fiber ribbon therein. The optical fiber ribbon including a plurality of optical fibers, the strength fibers generally surrounding and contacting the optical fiber ribbon within the sub-unit jacket. A cable jacket surrounds the central member and defines an annular space wherein the optical fiber sub-units are disposed about the central member. The annular space including essentially no strength fibers therein outside of the sub-unit jackets, the strength fibers being essentially located within the optical sub-unit jacket with the respective optical fiber ribbons.

17 Claims, 1 Drawing Sheet

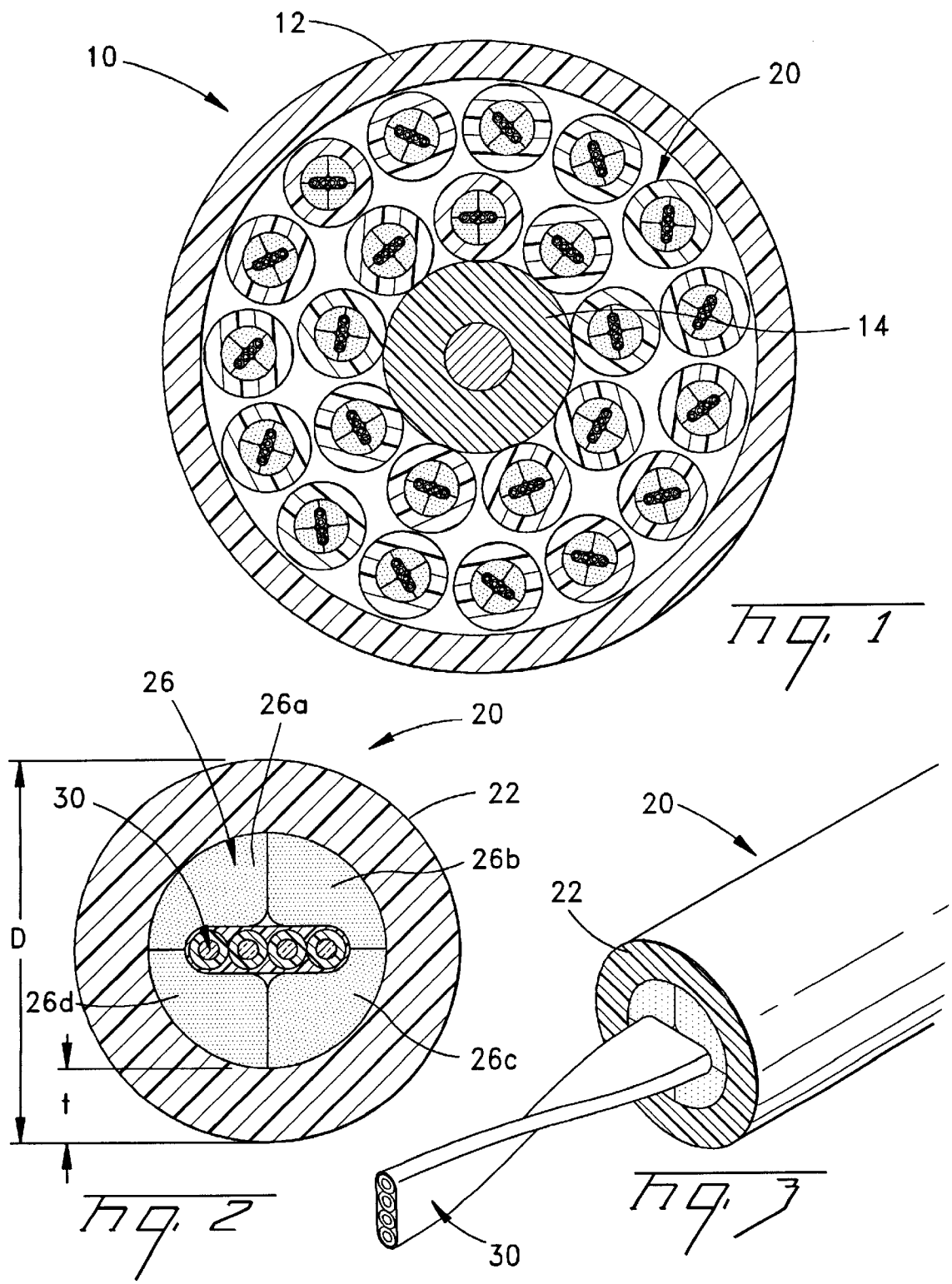

OPTICAL FIBER RIBBON FAN-OUT CABLES

The present invention relates to optical fiber cables, and, more particularly, to optical fiber fan-out cables. Conventional fiber optic cables include optical fibers that conduct light in the transmission of voice, video, and data information. Optical cables have the advantages of large bandwidth and low power loss. Typical applications for optical cables include fiber-to-the-curb (FTTC), fiber-to-the-home (FTTH), fiber-to-the-desk (FTTD), plenum, riser, and local area networks (LANs). In a premises environment, optical ribbon cables can be used to interconnect operating equipment, for example, computers, modems, and telephones. Original Equipment Manufacturers (OEMs) may require low-cost, optical interconnect cables that are factory connectorized to multi-fiber connectors, for example, for transceiver applications.

Transceiver applications require sufficient space between fibers to avoid electrical crosstalk. Opto-electrical and electro-optical transducer components, for example, are used in such systems to interface between electrical and optical modes of signal transmission. Electrical systems, however, may experience crosstalk between the signal wires thereof. This type of electrical crosstalk occurs due to electromagnetic fields surrounding the transmitting wires. The electromagnetic fields of one circuit induce currents and electromotive forces in adjacent circuits. For example, electrical crosstalk affecting a telephone line may result in the undesired mixing of caller conversations. Spacing the electrical wires of different circuits tends to reduce electrical crosstalk. On the other hand, because optical-based systems use confined light as the information carrying medium rather than electricity, optical-based systems are not as susceptible to crosstalk and therefore do not require a significant crosstalk type spacing between the optical fibers.

Opto-electrical and electro-optical transducers generally require electrical components, for example, wires to be spaced apart sufficiently enough to avoid crosstalk. For convenience, respective ends of optical fibers in single fiber cables, or dual tight-buffered cables, are connected to such transducers by placing them in housings comprising spaced-apart, fiber receiving apertures. Another method is to connectorize a two-fiber optical ribbon with a 250 $\mu$m to 750 $\mu$m spacing between the fibers. Such conventional methods can be relatively expensive in respect of installation and material costs because two fibers must be individually connectorized. Another method is to connectorize a 2-fiber optical ribbon with a 750 $\mu$m spacing to a multi-fiber connector, as described in U.S. Pat. No. 5,966,489 which is incorporated by reference herein. Optical fibers bonded to or received within tapes, as disclosed in U.S. Pat. No. 4,272,155, can be unsuitable for use with such connectorization procedures.

Multi-fiber interconnect cables are typically used indoors. Indoor fiber optic cables have been developed for installation in plenums and risers, and/or ducts of buildings. In order for a fiber optic cable to be rated for riser or plenum use, the cable must meet flame retardance standards as determined by means of vertical or horizontal flame tests. Exemplary requirements for such tests have been established by Underwriters Laboratories (UL). Since riser cables are typically installed in vertical shafts, the relevant standard for riser rated fiber optic cables is embodied in UL 1666, a flame test in a vertical shaft without a forced air draft in the shaft. UL 1666 does not include a smoke evolution requirement. UL has promulgated the riser rating requirements in a document entitled "Test for Flame Propagation Height of Electrical and Optical-Fiber Cables Installed Vertically in Shafts", wherein values for flame propagation height are set forth.

The relevant standard for plenum rated fiber optic cables is embodied in UL 910, a horizontal flame test setting forth flame propagation and smoke evolution requirements. In the construction of many buildings, a plenum can include, for example, a space between a drop ceiling and a structural floor above the drop ceiling. A plenum typically serves as a conduit for forced air in an air handling system, and the plenum is oftentimes a convenient location for the installation of fiber optic cables. If, in the event of a fire, the fire reaches the plenum area, flames that would otherwise rapidly propagate along non-plenum rated cables are retarded by plenum rated cables. Moreover, plenum rated cables are designed to evolve limited amounts of smoke. Riser rated cables tested to UL 1666 typically do not exhibit acceptable flame spread and smoke evolution results and are therefore unsuitable for plenum use.

The UL 910 test is promulgated by UL in a document entitled: "Test for Flame Propagation and Smoke-Density Values for Electrical and Optical-Fiber Cables Used in Spaces Transporting Environmental Air". A key feature of the UL 910 test is the Steiner Tunnel (horizontal forced air draft) test as modified for communications cables. During the UL 910 test, flame spread values are observed for a predetermined time (20 minutes under the current standard), and smoke is measured by a photocell in an exhaust duct. Data from the photocell measurements are used to calculate peak and average optical density values. Specifically, according to UL 910, the measured flame spread must not exceed five feet, peak smoke (optical) density must not exceed 0.5, and average smoke (optical) density must not exceed 0.15. For example, the fiber optical cables disclosed in U.S. Pat. Nos. 4,895,427, 5,229,851, and 5,249,249 contain flammable filling, flooding, or thixotropic grease compounds that render the cables unsuitable for use as plenum cables.

SUMMARY OF THE INVENTION

One aspect of the present invention is a fiber optic fan-out cable having optical sub-units. The optical sub-units are disposed about a central member, at least some of the optical sub-units respectively comprise a sub-unit jacket, strength fibers, and at least one respective optical fiber ribbon therein, the optical fiber ribbon including a plurality of optical fibers, the strength fibers generally surrounding and contacting the optical fiber ribbon in the sub-unit jacket. A cable jacket surrounds the central member and defines an annular space wherein the optical fiber sub-units are disposed about the central member. The annular space preferably includes essentially no strength fibers therein outside of the sub-unit jackets, the strength fibers being essentially located within the optical sub-unit jacket. However, if additional cable strength is required, then strength elements may be added to the annular space as needed.

BRIEF DESCRIPTION OF THE DRAWING FIGURES

FIG. 1 is a cross sectional view of a fiber optic fan-out cable according to the present invention.

FIG. 2 is a cross sectional view of a sub-unit cable of the fan-out cable shown in FIG. 1.

FIG. 3 is an isometric view of the sub-unit cable of FIG. 2.

DETAILED DESCRIPTION OF THE INVENTION

With reference to FIGS. 1–3, a low-cost fiber optic fan-out cable according to the present invention for use in, for example, FTTC, FTTH, FTTD, plenum, riser, or LAN applications will be described. The present invention can be practiced, for example, as an indoor, high fiber count, fiber optic fan-out cable 10 (FIG. 1) preferably having individual optical sub-units 20 and a cable jacket 12. In the preferred embodiment, cable 10 and sub-units 20 are all dielectric. In another aspect of the present invention, cable 10 and sub-units 20 do not include filling, flooding, or thixotropic grease compounds that can otherwise cause flame and/or smoke test failures. One or more layers of optical sub-units 20, that can be bundled with a conventional binder tape or cord, are preferably helically (unidirectionally) or SZ stranded about a central member 14 in an annular space between central member 14 and cable jacket 12. The lay length of sub-units 20 is preferably about 100 mm to about 1,000 mm, and is most preferably about 250 mm to about 300 mm. Central member 14 is preferably a glass reinforced plastic rod overcoated with a flame retardant thermoplastic material. The outside diameter of the GRP rod can be about 2.0 mm and the outside diameter of central member 14 can be about 5.6 mm or less. Preferably, the mechanical and geometrical characteristics of the GRP rod and the central member 14 can be determined by the number of subunits in the particular cable. Sub-units 20 can be stranded with other fiber optic components, for example, tight buffered or loose buffered optical fiber components (not shown). Cable jacket 12 is preferably formed of a flame retardant material that is extruded over sub-units 20. Cable jacket 12 preferably has a thickness of about 1.0 mm and an outside diameter of about 8 mm to about 30 mm, as determined by the number of sub-units 20 that are in the particular cable. The number of subunits 20 in a cable may vary from, for example, 3 to 36.

Optical sub-units 20 preferably each include at least one respective optical fiber ribbon 30 therein. Optical fiber ribbons 30 preferably include glass optical fibers, for example, one or more single mode optical fibers, or one or more multi-mode or multi-core optical fibers. Preferably, some of the fibers are mechanical fibers used for the spacing of other optical fibers rather than transmitting data. On the other hand, all optical fibers can be suitable for data transmission.

In a preferred embodiment, at least one and more preferably each respective sub-unit 20 includes an optical fiber ribbon 30 that is generally twisted about its longitudinal axis (FIG. 3). In addition, one or more of sub-units 20 can include a stack of optical fiber ribbons therein. For example, an optical fiber ribbon 30 or a stack of optical fiber ribbons 30 can be generally twisted about its longitudinal axis with a lay length of about 300 mm to about 1,000 mm. In this regard, optical ribbons 30 comprise an extruded matrix material, e.g., a UV curable acrylate, surrounding the optical fibers. The matrix material is preferably resilient and flexible enough to permit twisting of the optical ribbons without damage to the matrix or optical fibers. Exemplary optical fiber ribbons that are preferred for use in the present invention comprise those disclosed in commonly assigned U.S. Pat. Nos. 5,212,756, 5,457,762, 5,485,539, 5,561,730, 5,761,363, and 5,768,460, which are all respectively incorporated by reference herein. An advantage of twisting the optical ribbon is that the cable will exhibit reduced preferential bend behavior, eliminating the potential for stress to be induced in the optical fibers as it is wrapped about a cable reel (not shown) or otherwise during or after cable installation where the cable is bent.

Optical fiber ribbon 30 is preferably surrounded by at least one layer of strength fibers 26, for example, aramid or fiberglass strength fibers that essentially prevent coupling of optical fiber ribbon 30 to the jacket. The strength fibers act as a tensile strength member, provide coverage from the outer jacket during the extrusion process, and twist the optical ribbons along their respective lengths. In a preferred embodiment, four ends of aramid fibers 26a, 26b, 26c, 26d are twisted about each of optical ribbons 30 (FIGS. 2–3) causing the ribbons to resiliently twist.

Further, cable 10 includes aramid or strength fibers essentially, or more preferably exclusively, within jackets 22 so that no strength fibers need be placed between sub-units 20 and jacket 12. In other words, the annular space where the optical fiber sub-units are disposed about the central member includes essentially no strength fibers outside of the sub-unit jackets, the strength fibers being located within the optical sub-unit jacket. In an exemplary embodiment, four ends, or discrete yarns of aramid fibers, are stranded in a lay length of about 200 mm to about 800 mm. A preferred denier size of the aramid fibers is 1420$d$. A range of strength fiber deniers suitable for use with the present invention is 300d to 3000d. However, if additional cable strength is required, then strength elements may be added to the annular space as needed.

Jackets 22 can be formed of any suitable thermoplastic material, for example, polyvinyl chloride (PVC), polyethylene (PE), a UV curable resin (e.g. acrylate), or a fluoro-compound. The jacket material can include one or more flame retardant additives, for example, for assuring satisfactory plenum (e.g. UL-920), riser (e.g. UL-2666), or low smoke zero halogen (LSZH) cable burn performance characteristics. In preferred embodiments, a riser application comprises a flexible PVC, a plenum application comprises a filled PVC, and a LSZH application comprises a non-halogenated jacketing material. The jacket can include strength members (not shown) embedded therein. The embedded strength members can be, for example, aramid fibers, or glass or fiber reinforced plastic rods/strands. Preferably the outside diameter D of sub-units 20 (FIG. 2) is a minimum of about 2.5 mm, and is most preferably about 2.9 mm, with a thickness t of about 0.5 mm.

Sub-units 20 can be manufactured by passing optical fiber ribbons 30 and strength fibers 26 through an extruder and extruding the jackets therearound. Prior to extrusion, strength fibers 26 can be dusted with a talc powder to prevent sticking of the jackets to the strength fibers. Strength fibers 26 are stranded and are at least partially in contact with optical ribbons 30, whereby stranding of the strength fibers forces optical ribbons 30 to be resiliently twisted about their respective longitudinal axes. In addition, strength fibers 26 protect optical ribbons 30 from the molten outer jacket material during the extrusion process. Without proper coverage, optical ribbons 30 could intermittently tack to the jacket, which could produce high attenuation in the optical fibers if the cable were under tensile or compressive loads, or temperature induced expansion/contraction of the jacket. The die profile can be shaped so that sub-units 22 have a generally round cross section. Alternatively, the die can be shaped to form other cross sectional shapes.

Sub-units 20 can easily be connectorized by removing a section of jackets 22 and connectorizing the optical fiber ribbons. The optical fiber ribbons can be factory or field connectorized to single or multi-fiber connectors. In addition, bending induced attenuation changes are minimized by cables of the present invention. For example, the twist created in the optical fiber ribbons by the stranded strength fibers prevents the optical ribbons from being strictly aligned in a parallel relationship. Since the optical ribbons are resiliently twisted, bending of cable 10 can occur with minimal amounts of fiber stress and attenuation. In other words, applying strength fibers 26 helically generally about the longitudinal axis of the optical ribbons produces a resiliently flexible twist in the optical ribbons and prevents high attenuation in the fibers during bending. Moreover, locating all strength fibers to be within jackets 22 eliminates the need for strength fibers outside of the sub-units, which renders cable 10 and sub-units 20 very rugged for installation purposes. The optical ribbons 30 in combination with the relatively small outside diameter of the cable provides fan-out cables with an advantageously high fiber count for its cross sectional area. In addition, the preferred embodiment excluding flooding, filling, and thixotropic compounds renders the cable suitable for indoor use.

The present invention has thus been described with reference to the foregoing embodiments, which embodiments are intended to be illustrative of the present inventive concepts rather than limiting. Persons of ordinary skill in the art will appreciate that variations and modifications of the foregoing embodiments can be made without departing from the scope of the appended claims. For example, an optical sub-unit 20 can include multiple optical fiber ribbons in a stack that is caused to be resiliently twisted about its longitudinal axis. Where wavelength selection features are desired in the optical sub-unit, one or more periodic refractive indices can be written into the fiber before buffering or ribbonizing, for example, as disclosed in U.S. Pat. No. 4,725,120, U.S. Pat. No. 5,620,495, U.S. Pat. No. 5,718,738, and/or U.S. Pat. No. 5,818,630, all of which are respectively incorporated by reference herein. For identification purposes, an identification means can be provided on either or both of jackets 12,22. The identification means can include different colors for the sub-units, one or more extruded or inked-on stripes, or any other suitable identification means. Fan-out cables according to the present invention can include fiber optic cable components, for example, ripcords or water blocking yarns.

Accordingly, what is claimed is:

1. A fiber optic cable, comprising:
   optical sub-units disposed about a central member, at least some of said optical sub-units each respectively comprising a sub-unit jacket, strength fibers, and at least one respective optical fiber ribbon therein, the optical fiber ribbon including a plurality of optical fibers surrounded by an extruded matrix material, at least some said strength fibers generally surrounding and contacting said optical fiber ribbon in said sub-unit jacket; and
   a cable jacket surrounding said central member and defining an annular space wherein said optical fiber sub-units are disposed about said central member, said annular space including essentially no strength fibers therein outside of said sub-unit jackets, said strength fibers being essentially located within said optical sub-unit jacket with respective said optical fiber ribbons.

2. The fiber optic cable of claim 1, said central member comprising a glass reinforced plastic rod overcoated with a thermoplastic material.

3. The fiber optic cable of claim 1, said sub-units being generally helically stranded about said central member.

4. The fiber optic cable of claim 3, said stranded sub-units comprising a lay length of about 100 mm to about 1,000 mm.

5. The fiber optic cable of claim 1, said strength fibers comprising an aramid material.

6. The fiber optic cable of claim 1, said sub-unit jacket comprising a thermoplastic selected from the group consisting of PVC, PE, UV curable resins, and fluoro-compounds.

7. The fiber optic cable of claim 1, said cable jacket comprising a thickness of about 1.0 mm.

8. The fiber optic cable of claim 1, said cable jacket comprising an outside diameter of about 8 mm to about 30 mm.

9. A fiber optic cable suitable for indoor use and excluding flooding, filling, and/or thixotropic compounds, said cable comprising:
   at least two layers of optical sub-units disposed about a central member, at least some of said optical sub-units each respectively comprising a sub-unit jacket, strength fibers, and at least one respective optical fiber ribbon therein, the optical fiber ribbon including a plurality of optical fibers, at least some of said strength fibers being stranded about and generally surrounding and contacting each respective said optical fiber ribbon in said sub-unit jacket; and
   a cable jacket surrounding said central member and defining a annular space wherein said optical fiber sub-units are disposed about said central member, said annular space including essentially no strength fibers therein outside of said sub-unit jackets, said strength fibers being essentially located within said optical sub-unit jacket with respective said optical fiber ribbons.

10. The fiber optic cable of claim 9, said central member comprising a glass reinforced plastic rod overcoated with a thermoplastic material defining an outside diameter of less than about 5.6 mm.

11. The fiber optic cable of claim 1, said sub-units being generally helically stranded about said central member.

12. The fiber optic cable of claim 11, said stranded sub-units comprising a lay length of about 250 mm to about 300 mm.

13. The fiber optic cable of claim 9, said strength fibers being selected form the group consisting of aramid and fiberglass fibers.

14. The fiber optic cable of claim 9, said sub-unit jacket comprising a thermoplastic selected from the group consisting of PVC, PE, UV curable resins, and fluoro-compounds and having a minimum outside diameter of about 2.5 mm.

15. The fiber optic cable of claim 9, said cable jacket defining a single layer of material having a thickness of about 1.0 mm.

16. The fiber optic cable of claim 9, said cable jacket comprising an outside diameter of about 18 mm to about 20 mm.

17. The fiber optic cable of claim 9, said cable and said sub-units being all dielectric.

* * * * *